United States Patent Office 3,558,740
Patented Jan. 26, 1971

3,558,740
HIGH IMPACT STRENGTH POLYMERS
Erich Behr and Johannes Schneider, Troisdorf, Germany, assignors to Dynamit Nobel AG, Troisdorf, Germany, a corporation of Germany
No Drawing. Filed Nov. 22, 1967, Ser. No. 684,961
Claims priority, application Germany, Nov. 28, 1966, D 51,659; Aug. 18, 1967, D 53,882
Int. Cl. C08g 43/02
U.S. Cl. 260—823                              7 Claims

ABSTRACT OF THE DISCLOSURE

Blend of a polyphenylene oxide polymer and a polyether with diphenylsulfone- and bisphenol A-units in proportion of about 5 to 60 weight percent of the latter to produce a moldable product having a synergistically higher impact strength than either component alone.

---

Polyphenylene oxide polymers, and particularly polymers of 2,6-dimethylphenol, are known. These materials are known to have excellent mechanical and thermal properties and therefore to be quite valuable in the plastic forming art.

Polyethers with diphenylsulfone and bisphenol A [2,2-bis(p,p'-phenol)propane]-units under the name "polysulfone" are known materials which also have excellent thermal and mechanical properties. (See Mod. Plast. 42/9 (1965) 87).

It is known that the mechanical and thermal properties of both of these polymers are about equivalent and therefore it would be expected that blends of these polymers would have substantially equivalent physical properties.

It has been found that when these two polymers are blended together, most of the physical properties of the mixture are as would be expected, that is substantially equivalent to the corresponding physical property of either of the polymers which have been blended.

However, it has most unexpectedly been discovered that when about 5 to 60 weight percent of the blend is accounted for by the copolymer with the remainder being the polyphenylene oxide, the impact strength of the blend is extraordinarily and unexpectedly high while the other physical properties are about as would be expected.

It has been found that the blending may be accomplished in solution or in the fused state if the proportion of copolymer is about 5 to 35 weight percent, preferably about 10 to 30 weight percent. However, for the remainder of the range, it is preferred that the polymers are blended in a high speed vortex mixer either at room or at elevated temperatures.

When operating the blending aspect of this invention in a solvent, it is suitable to employ substantially any mutual solvent for both polymers. Exemplary solvents include chloroform, trichloroethylene, methylene chloride, carbon tetrachloride, benzene, toluene or xylene. Particularly appropriate are chloroform and/or trichloroethylene, not only on account of their good dissolving properties, but also because polyphenylene oxide is manufactured in these solvents, and consequently the solutions remaining after the separation of the oxidation catalyst can be used directly in the process of the invention. After dissolution of the polymers, they are coprecipitated as a mixture or blend. Appropriate precipitating agents are, for example, methanol, ethanol, acetone, petroleum ether or diethyl ether, but particularly methanol.

It is preferred in the practice of this invention to premix the two polymers in a high speed vortex mixer at about room temperature and then to soften and possibly work (plasticize the blend at about 270 to 330° C. in conventional equipment in a known manner. By conventional compounding units are meant the following: single or double screw extruding machines, intimate mixing machines (dough mills), injection molding machines or bus mills. Bus mills have a rotating screw inside of the cylinder which is provided with stationed paddles; the screw additionally performs a pulsating movement.

As noted above, the mechanical and thermal properties of the two polymers are about the same and their working temperatures are about the same. The notch impact strength measured on standard specimens according to DIN 53,453 runs around 10 cm. kg./cm.$^2$ for poly-2,6-dimethylphenol, and around 7 cm. kg./cm.$^2$ for polysulfone. It is therefore very surprising that the notch impact strength can be improved to as much as 50 cm. kg./cm.$^2$ by compounding the two polymers. This improvement. however, is to be found only when the mixture ratios are as cited. The maximum lies at about 20% copolymers of polysulfone to 80% poly-2,6-dimethylphenol. At a mixture ratio of higher than 40:60, the effect vanishes and the theoretically expected combination values are achieved. Outside of the notch impact strength, no other abrupt changes are observed in any of the properties. The two polymers are compatible with one another and the mixtures are uniform.

One special advantages of the procedure described lies in the fact that a thermoplastic material is obtained whose high mechanical strength is maintained up to approximately 200° C., but whose notch impact strength is one of the highest measured in plastics.

The following examples further illustrates this invention without being limiting thereon.

EXAMPLES 1 TO 6

Polysulfone and poly-2,6-dimethylphenol were premixed for 10 minutes at a room temperature in a vortex mixing machine in powder form in the mixture ratios given in the table, and then they were extruded in an "Alpine" 60 D1 double worm extruding machine at cylinder temperatures of 265, 300, 300, 300 and 300° C. (individual zones in order of progress towards the die) and at a die temperature of 300° C.

The fused material produced in the form of strings at the extrusion die was cooled and cut into cylindrical granules in a chopping machine.

These were then injection-molded to form notched impact test specimens at an injection temperature of 300° C., an injection pressure of 1100 kg./cm.$^2$, an injection cycle of 70 sec., a holding period of 50 sec., and a mold temperature of 150° C.

The notch impact strength was determined according to DIN 53,453. Outside of the impact strength no appreciable variations could be found in the material, so that the rest of the test data are not given.

| Mixture | Example No. | | | | | |
|---|---|---|---|---|---|---|
| | 1 | 2 | 3 | 4 | 5 | 6 |
| Poly-2,6-dimethylphenyl, percent | 90 | 80 | 70 | 60 | 55 | 50 |
| Copolymers of 50% diphenylsulfone and 50% bisphenyl A, percent | 10 | 20 | 30 | 40 | 45 | 50 |
| Notch impact strength in cm. kg./cm.² | 16 | 19 | 36 | 43 | 33 | 14 |

EXAMPLE 7

700 g. of poly-2,6-dimethylphenol were dissolved in 8 l. of chloroform with heating and strong agitation. The solution was then cooled to room temperature and precipitated with methanol. In order to obtain an easily injection-moldable product in powder form, first methanol was added drop by drop with strong agitation until constant turbidity was obtained, and then abruptly a large excess of methanol was added. The product was suction filtered, washed twice with methanol and dried in vacuo at 100° C. The mixture was tested on the thermobalance for freedom from solvent, and was then injection-molded under the conditions described in the table.

EXAMPLE 8

630 g. of poly-2,6-dimethylphenol were compounded with 70 g. of polysulfone according to Example 1.

EXAMPLE 9

560 g. of poly-2,6-dimethylphenol were compounded with 140 g. of polysulfone according to Example 1.

EXAMPLE 10

420 g. of poly-2,6-dimethylphenol were compounded with 280 g. of polysulfone according to Example 1.

It will of course be appreciated that the blend of this invention is useful for the same purposes and in the same manner as the polymers from which it is prepared. Molding compositions of this blend may contain the usual known additives in the conventional proportions for known purposes. These additives include dyes, pigments, fillers, reenforcing agents, stabilizers, plasticizers, adjuvants and the like.

What is claimed is:

1. A blend comprising polyphenylene oxide, prepared by polymerizing 2,6-dimethyl phenol, and about 5 to 60 weight percent of a polyarylether prepared by copolymerizing diphenylsulfone and 2,2-(bis-p,p'-phenol)propane.

2. A blend as claimed in claim 1 wherein said polyarylethers is present in proportion of about 10 to 50 weight percent.

3. A blend as claimed in claim 1 wherein said polyarylether comprises about 50% diphenylsulfone and 50% 2,2-(bis-p,p'-phenol)propane units.

4. A blend as claimed in claim 1 wherein said polyarylether is present in a proportion of about 5 to 35 weight percent.

5. A blend as claimed in claim 1 wherein said polyarylether is present in a proportion of about 10 to 30 weight percent.

6. Process of producing a blend of polyphenylene oxide, prepared by polymerizing 2,6-dimethyl phenol, and about 5 to 60 weight percent of a polyarylether prepared by copolymerizing diphenyl sulfone and 2,2-(bis-p,p'-phenol)propane which comprises dissolving said polyphenylene oxide and said copolymer in a mutual solvent; and then jointly precipitating both polymers from said mutual solvent.

7. Process of producing a blend of polyphenylene oxide prepared by polymerizing 2,6-dimethyl phenol, and about 5 to 60 weight percent of a polyaryl ether prepared by copolymerizing diphenyl-sulfone and 2,2-(bis-p,p'-phenol) propane by admixing said polymers in powder form in high speed vortex mixing means, and then plastifying said mixture at about 270 to 330° C.

TABLE

| | 100% PPO | 90% PPO, 10% polysulfone | 80% PPO, 20% polysulfone | 60% PPO, 40% polysulfone | 100% polysulfone |
|---|---|---|---|---|---|
| Density ¹, g./cm.³ | 1.07 | 1.08 | 1.10 | 1.13 | 1.24 |
| Ultimate tensile strength ², kg./cm.² | 700 | 710 | 700 | 655 | 540 |
| Elastic limit ³, kg./cm.² | 1,140 | 1,150 | 1,145 | 1,040 | 1,08 |
| Modulus of elacticity, kg./cm.² | 24,000 | 24,400 | 24,400 | 24,400 | 27,000 |
| Notch impact strength ⁴, cm. kg./cm.² | 9.5 | 29 | 49 | 6.1 | 6.3 |
| Vicat temperature ⁵, ° C | 214 | 210 | 208 | 205 | 195 |
| Martens heat ⁶, ° C | 167 | 166 | 163 | 160 | 155 |
| Viscosity, cm.³/g | 0.72 | 0.72 | 0.68 | 0.66 | 0.48 |
| Decomposition point (thermobalance), ° C | 380 | 375 | 380 | 380 | 430 |
| Injection molding conditions, ° C | 300 | 290 | 285 | 285 | 300 |
| Injection molding temperature, kg./cm.² | 1,100 | 1,100 | 1,100 | 1,100 | 1,100 |
| Injection cycle, min | 2 | 2 | 2 | 2 | 2 |
| Holding time, sec | 70 | 70 | 70 | 70 | 70 |
| Molding temperature, ° C | 150 | 150 | 150 | 150 | 150 |

¹ Test: DIN No. 53,479.  ² Test: DIN No. 53,504.  ³ Test: DIN No. 53,452.  ⁴ Test: DIN No. 53,453.
⁵ Test: DIN No. VDE 0302.  ⁶ Test: DIN No. 53,458.

References Cited

UNITED STATES PATENTS 3,375,297  3/1968  Barth et al. _____ 260—823
3,378,505  4/1968  Hay _____ 260—47

SAMUEL H. BLECH, Primary Examiner

M. J. TULLY, Assistant Examiner

U.S. Cl. X.R.

260—47, 49

PO-1050
(5/69)

UNITED STATES PATENT OFFICE
CERTIFICATE OF CORRECTION

Patent No. 3,558,740                    Dated January 26, 1971

Inventor(s) Erich Behr and Johannes Schneider

It is certified that error appears in the above-identified patent and that said Letters Patent are hereby corrected as shown below:

Column 2, line 45, "a" (first occurrence) should be deleted

Column 3, third item in last column of Table, "1,08" should read --1080--

Signed and sealed this 22nd day of June 1971.

(SEAL)
Attest:

EDWARD M. FLETCHER, JR.                  WILLIAM E. SCHUYLER,
Attesting Officer                        Commissioner of Patent